(12) United States Patent
Tarara et al.

(10) Patent No.: US 9,159,074 B2
(45) Date of Patent: Oct. 13, 2015

(54) TOOL FOR EMBEDDING COMMENTS FOR OBJECTS IN AN ARTICLE

(75) Inventors: Jen Tarara, Denver, CO (US); Gamaiel Nathaniel Zavala, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 893 days.

(21) Appl. No.: 12/409,344

(22) Filed: Mar. 23, 2009

(65) Prior Publication Data

US 2010/0241968 A1 Sep. 23, 2010

(51) Int. Cl.
*G06Q 30/02* (2012.01)
*G06F 3/0481* (2013.01)
*G06F 17/24* (2006.01)

(52) U.S. Cl.
CPC .............. *G06Q 30/02* (2013.01); *G06F 3/0481* (2013.01); *G06F 17/241* (2013.01)

(58) Field of Classification Search
CPC . G06F 3/0481; G06Q 10/101; H04L 12/1822
USPC ........................... 715/751, 230, 512; 709/203
See application file for complete search history.

(56) References Cited

U.S. PATENT DOCUMENTS

| | | | |
|---|---|---|---|
| 5,537,618 | A | 7/1996 | Boulton et al. |
| 5,872,924 | A | 2/1999 | Nakayama et al. |
| 6,574,792 | B1 | 6/2003 | Easton |
| 6,865,713 | B1 | 3/2005 | Bates et al. |
| 6,950,982 | B1 | 9/2005 | Dourish |
| 7,130,885 | B2 | 10/2006 | Chandra et al. |
| 7,143,089 | B2 | 11/2006 | Petras et al. |
| 7,346,849 | B1 | 3/2008 | Mulligan et al. |
| 7,356,803 | B2 | 4/2008 | Bau, III et al. |

(Continued)

FOREIGN PATENT DOCUMENTS

| | | |
|---|---|---|
| JP | 2007/334503 | 12/2007 |
| JP | 2008/117374 | 5/2008 |

(Continued)

OTHER PUBLICATIONS

Schonfeld, Erick, "Reframe it Retreads Web Annotation As a Browser Add-On", TechCrunch, Oct. 8, 2008, http://www.techcrunch.com/2008/10/08/reframe-it-retreads-web-annotation-as-a-browswer-add-on/, accessed Nov. 20, 2008 (2 pages).

(Continued)

*Primary Examiner* — Rashawn Tillery
(74) *Attorney, Agent, or Firm* — Martine Penilla Group, LLP

(57) ABSTRACT

Embodiments are directed to managing viewer entered comments about a specific word, phrase, picture, or other multimedia content, such as a picture, sound, or video clip, in an article, document, and/or a web page. A document is presented to a viewer, wherein the document includes special highlighting (e.g., font type/size, underlining, colors, and the like) of certain portions of the document defining one or more target objects. The highlighted portions are determined for the viewer according to a plurality of unique lists of target objects defined by an author of the multimedia content. The viewer selects the target object and a list of recent comments related specifically to the selected target object is displayed. The viewer may also enter comments directly related to the same or a different target object. Advertisements related to the target objects may be displayed to the user when the user selects the target object.

19 Claims, 10 Drawing Sheets

(56) References Cited

U.S. PATENT DOCUMENTS

| | | | |
|---|---|---|---|
| 7,370,285 | B1 | 5/2008 | Nickerson et al. |
| 7,373,318 | B2 | 5/2008 | Kutsumi et al. |
| 7,379,704 | B2 | 5/2008 | Parker et al. |
| 7,392,469 | B1 | 6/2008 | Bailin |
| 7,409,362 | B2 | 8/2008 | Calabria |
| 7,437,421 | B2 | 10/2008 | Bhogal et al. |
| 7,451,142 | B2 | 11/2008 | Arellanes et al. |
| 7,451,188 | B2 | 11/2008 | Cheung et al. |
| 7,631,007 | B2 * | 12/2009 | Morris ............ 709/224 |
| 2004/0172323 | A1 | 9/2004 | Stamm |
| 2005/0005258 | A1 | 1/2005 | Bhogal et al. |
| 2006/0048046 | A1 * | 3/2006 | Joshi et al. ............ 715/512 |
| 2006/0101328 | A1 * | 5/2006 | Albornoz et al. ............ 715/512 |
| 2007/0271502 | A1 * | 11/2007 | Bedi et al. ............ 715/512 |
| 2007/0300160 | A1 * | 12/2007 | Ferrel et al. ............ 715/744 |
| 2008/0016105 | A1 * | 1/2008 | Freeland et al. ............ 707/102 |
| 2008/0209361 | A1 | 8/2008 | Nickerson et al. |
| 2008/0222511 | A1 * | 9/2008 | Kambhatla et al. ............ 715/230 |
| 2008/0250327 | A1 | 10/2008 | Li et al. |
| 2008/0270406 | A1 | 10/2008 | Flavin et al. |
| 2009/0165128 | A1 * | 6/2009 | McNally et al. ............ 726/21 |
| 2009/0199082 | A1 * | 8/2009 | Hollander et al. ............ 715/230 |
| 2009/0217149 | A1 * | 8/2009 | Kamien et al. ............ 715/230 |
| 2010/0070845 | A1 * | 3/2010 | Facemire et al. ............ 715/230 |
| 2010/0278453 | A1 * | 11/2010 | King ............ 382/321 |

FOREIGN PATENT DOCUMENTS

| | | |
|---|---|---|
| JP | 2008/146585 | 6/2008 |
| WO | WO-2007/116204 A1 | 10/2007 |
| WO | WO-2007/135688 A2 | 11/2007 |
| WO | WO-2008/061290 A1 | 5/2008 |

OTHER PUBLICATIONS

Gonzalez, Nick, "Five Ways to Mark Up the Web", TechCrunch, Apr. 10, 2007, http://techcrunch.com/2007/04/10/5-ways-to-mark-up-the-web/, accessed Nov. 20, 2008 (2 pages).

Needleman, Rafe, "Take your favorite blogs for a walk with Stickis", Webware-CNET, Nov. 28, 2006, http://news.cnet.com/8301-17939_109-9665274-2.html?tak=blog, accessed Nov. 20, 2008 (2 pages).

Sherman, Chris, "Diigo Offers Social Annotation Tool", Search Engine Watch (SEW), Jul. 26, 2006, http://searchenginewatch.com/3622969, accessed Nov. 20, 2008 (1 page).

Kirkpatrick, Marshall, "Fleck Offers Zero Friction Web Annotation", TechCrunch, Nov. 16, 2006, http://www.techcrunch.com/2006/11/16/fleck-offers-zero-friction-web-annotation/, accessed Nov. 20, 2008 (2 pages).

Heck, Rachel M. et al., "A survey of Web Annotation Systems", Department of Mathematics and Computer Science Grinnel College, 1999, http://www.math.grin.edu/~rebelsky/Blazers/Annotations/Summer1999/Papers/survey_paper.html, accessed Nov. 20, 2008 (6 pages).

* cited by examiner

TOOL FOR EMBEDDING COMMENTS FOR OBJECTS IN AN ARTICLE

TECHNICAL FIELD

The present disclosure is directed to media content, in general, and to embedding micro-comments directed to objects in an article, in particular, but not exclusively.

BACKGROUND

With the ubiquity of computers and communication networks, such as the Internet, human interactions and communications have increased exponentially in recent years. More particularly, with the development of the World Wide Web (WWW) and application programs called browsers that are used as an interface for the WWW, users can communicate in a variety of ways. The client-server architecture is one of the most common architectures employed in utilizing the WWW, although other architectures and methods, such as peer-to-peer and ad-hoc communications, may also be used. The browser programs, residing on client devices, provide an interface for presenting web pages residing on data stores associated with web server devices to the users. Such web pages may contain a variety of multimedia content, including text, pictures, sounds, and video. The users may interact and communicate with such content, for example, by entering text or uploading pictures. Moreover, the users may also interact with other users over the network.

BRIEF DESCRIPTION OF THE DRAWINGS

Non-limiting and non-exhaustive embodiments of the present invention are described in reference to the following drawings. In the drawings, like reference numerals refer to like parts through all the various figures unless otherwise explicit.

For a better understanding of the present disclosure, a reference will be made to the following detailed description, which is to be read in association with the accompanying drawings, wherein.

DETAILED DESCRIPTION

Figure 1:
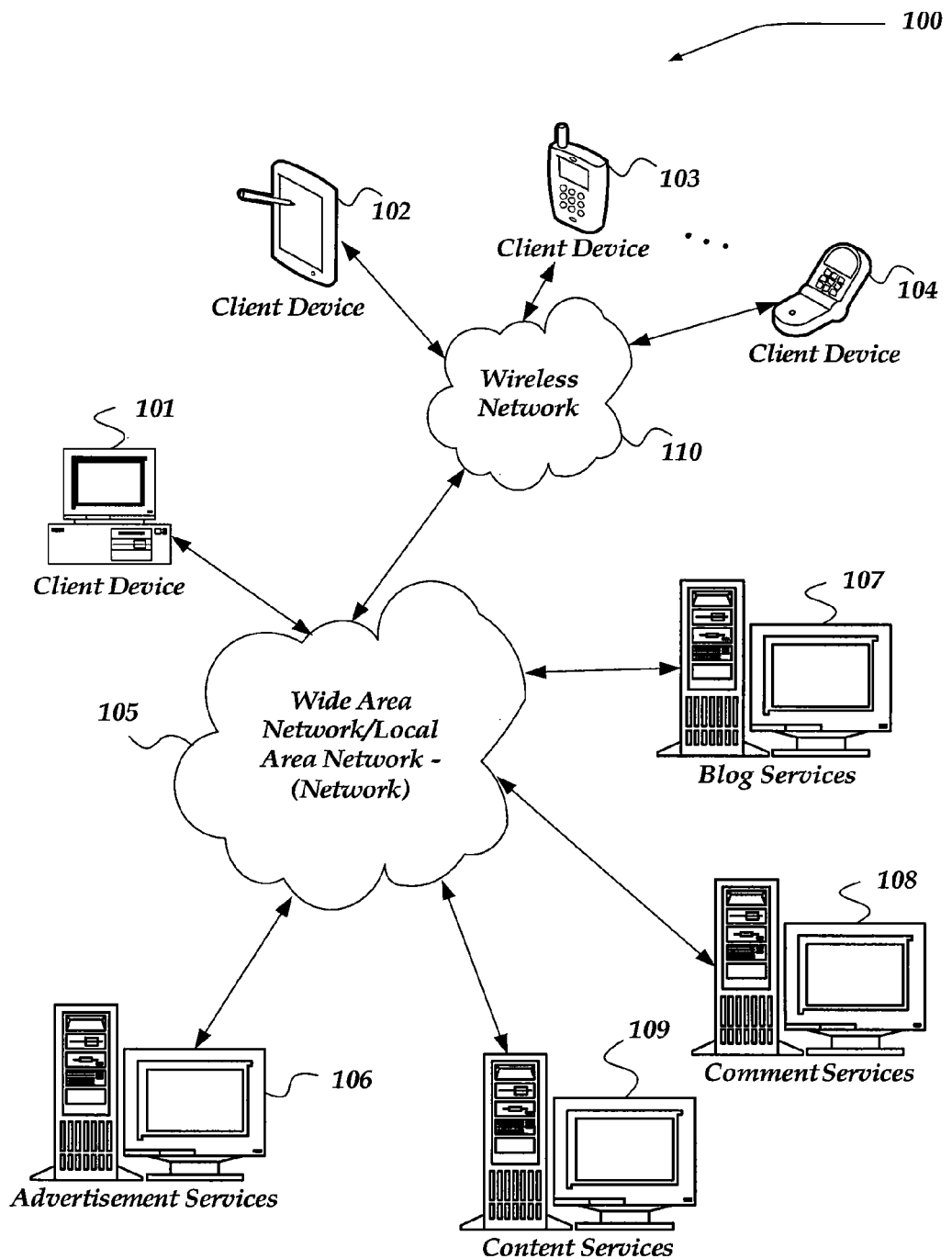
FIG. 1 is a system diagram of one embodiment of an environment in which aspects of the invention may be practiced.

The present disclosure will now be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on".

The term "content", as used herein, refers to a main or central portion of an electronic document, such as a web page, a spreadsheet, a presentation slide, and/or the like. Such a main or central portion is directed toward a theme or concept of a website, archive, or other form of repository for hosting or storing the electronic document. For example, a main portion of a web page may be an entry made in a web log (blog). The term "content" is distinguished herein from the term "comment" and/or "micro-comment". The terms "comment" and "micro-comment", as used herein, refer to an annotation or discussion about a subset of the content as is further discussed herein.

The term "target object" as used herein, may represent a word, a phrase, a section of text, a picture, an icon, or any other software object that may be included, embedded, or otherwise be identified in the content of an electronic document. Thus, in one embodiment, a target object may be embedded, in the sense that it is linked, or included within another webpage, document, or the like. However, in another embodiment, the target object may be a word, text, or the like, that is a part of the webpage, document, or the like. This term may represent a subset, a portion less than all, of the content of such electronic document. For example, in an article having hundreds of words as its content, the target object may be limited to one or a few words and phrases that represent less than all of the content in the article. Similarly, in a web page that shows multiple words, pictures, icons, and/or the like, the target object may be a word or a picture or any portion of the content that is less than all of the content.

The terms "content author" and "viewer", as used herein, refer to entities having different permissions with respect to content. A content author is permitted to at least draft, edit, and submit the content for publication other form of distribution. A viewer is not allowed to draft or edit the content. Both a content author and a viewer are able to provide and associate comments with the content. A "user", as applied herein, refers to a viewer of the content.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly described, the present disclosure is directed to a system, apparatus, and method for writing, reading, and processing comments directed to a target object, for example, a specific word, phrase, graphic, or other multimedia content, such as a sound, or video clip, that is embedded in an article, a document, and/or a web page. In operation, an article or document is displayed to a user having a special highlight (for example, font type, font size, underlining, different colors, and the like) on certain portions of the document. That is, the target object may be identifiable as being available for associating comments and/or having associated comments based on at least one of highlighting of the target object, a font type, a font size, an underlining of the target object, a color, or the like, to uniquely distinguish the target object from another portion of the content being displayed.

The certain portions of the document may include but are not limited to, words, phrases, or other objects, such as a picture/graphic. These certain portions may be used to define a target object for comments. The user selects the target object, for example, by performing an action identified as being associated with the target object, such as by clicking or "mousing over" with a computer mouse the target object, or by using other pointing devices, or by performing other actions. In response, a dialog selectively appears providing a list of recent comments from other users related to the target object. In one embodiment, that is, if the user's action is detected, comments may be displayed in a separate window over a portion of the content. However, if the user's action is undetected, then the display of the comments or the separate window over the portion of the content may be inhibited.

When the comments (or comment window) are displayed, the user may enter comments directly related to the same target object. In one embodiment, the comments may be limited to a predetermined number of words to maintain data manageability, readability, easy interaction between a number of different users, and/or ease of selectively displaying of comments to other users. In another embodiment, such limitations may be overruled. Advertisements related to the target objects also may be displayed to the user when the user selects the target object.

The author of content in the document may control the focus of the users' comments by specifying which portions of the document to highlight for use as a target of user comments. The author may define a plurality of lists of different portions to be highlighted for different viewers. The author may also define a number of words a user can enter as a comment. That is, content and lists of target objects may be received by a network device, from a content author, where unique subsets of the content are identified in each list as target objects about which viewers of the content may associate a comment. One or more of the lists are subsequently associated with the viewer's client device or other viewer identifier. The association of the one or more lists may be based, for example, on a user or user profile determined to be active at the client device. The content may then be displayed at the viewer's client device, where the target objects listed in the one or more associated lists and included within the displayed content are identifiable as being available for associating comments.

Since a target object may be specific and/or focused on one subject matter, in one embodiment, the length of the comments may accordingly be small and/or limited to a few words or sentences, like a conversation between the users about the target object. Such micro-comments enable users to write, read, and promote dialog-style interaction between other users interested in the subject matter of the target object. Traditionally, user comments about an article or other multimedia content are entered at the end of the article and the subject matter or focus of the comments can often only be determined based on the contents of the comments. With focused and predefined target objects, micro-comments from users can be more easily categorized based on subject matter defined by the target objects. Thus, in one embodiment, automated statistical and relational analysis of users' interests with respect to specific target objects, both aggregate and individually, may be performed.

Advertisers may associate appropriate service and/or product advertisements with the target objects, at least in part, based on the statistical analysis, a subject of a target object, and/or other data obtained from the micro-comments about specific target objects. Such contextual advertisements may be displayed to the users in a variety of ways, including but not limited to on the sides of the web page, in a dialog window, or by links leading to additional advertising information, among others. The advertisements may be matched with the target objects, for example, based on a subject matter of the target object, and be associated with the target object on the web page by a comment server, as more fully described below.

Those skilled in the relevant arts will appreciate that even though the present disclosure describes various embodiments in a web environment with a client-server computing architecture, the same concepts, methods, and systems may be applied to other application environments without departing from the spirit of the present disclosures. Moreover, micro-comments also may be applied to on-line books, articles, proceedings, emails, or other written and/or multimedia content in dedicated software applications distinct from a browser used in a web environment. Such dedicated software applications may be utilized in libraries, research facilities, government offices, business offices, and the like Additionally, although the illustrative discussions of micro-comments in the present disclosure are directed to micro-comments about text, graphic, or other objects embedded in an online article or document, micro-comments may also be applied to target objects within a multimedia stream, such as a video segment, by defining target objects that appear within the multimedia stream. For example, in a video segment an actress may be wearing an interesting dress. The dress may be defined as a target object and users watching the video segment may comment specifically about the dress. This method of commenting provides valuable and focused data regarding user interests to advertisers, film producers, and generally, content providers.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, advertisement (ad) services 106, blog (web log) services 107, comment services 108, and content services 109.

One embodiment of a client device usable as one of client devices 101-104 is described in more detail below in conjunction with FIG. 2. Briefly, however, client devices 102-104 may include virtually any mobile device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), or the like, to display and send information.

Client devices 101-104 also may include at least one other client application that is configured to send or receive content from another computing device, including, without limit, blog services 107 and content services 109. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. A user account may be associated with a client device based on a login operation being successfully performed for the user account at the client device. However, managing of messages or otherwise accessing and/or downloading content, may also be performed without logging into the user account. Thus, a user of client devices 101-104 may employ any of a variety of client applications to access content, read web pages, receive/send messages, or the like.

In one embodiment, for example, the user of one of client devices 101-104 may employ a browser or other client application to access a web page hosted by blog services 107. In one embodiment, a user of one of client devices 101-104 may access content over a network and view comments displayed about specific aspects of the content. The received content may have been generated by a content author such that multiple subsets of the content are identified by the content author in target object lists, or through another mechanisms, as unique sets of target objects about which viewers of the content may associate a comment. That is, the content may be displayed at the user's client device such that target objects listed on at least one target object list associated with the client device and included within the displayed content are identifiable as being available for associating or viewing comments from others. In one embodiment, the at least one object list may be associated with the client device based on a social network relationship defined by the content author and associated with the user's client device prior to transmission of the content to the client device. In one embodiment, the comments may have been submitted by other viewers of the content. That is, in one embodiment, the comments that may be displayed may include a plurality of comments associated with the target object where at least one of the plurality of comments is received for display from a different client device than another of the plurality of comments. In one embodiment, at least two of the plurality of different comments are entered by different users for selectively being displayed. In one embodiment, the content author may also provide one or more comments about the content.

Further, the user of one of client devices 101-104, may provide a comment about one or more of the target objects in the received content that is also listed in a target object list associated with the user's client device. The user may mouse over, or perform some other action that may be identified as being associated with the target object such that the user's comment may be selectively displayed to the user's client device. While the user may see all target objects in the received content, a target object in a target object list that is not associated with the user—and not on a list that is associated with the user or user's client device—is not identifiable to the user as a target object and the user is inhibited from viewing or providing comments for the non-identified target object.

Wireless network 110 is configured to couple client devices 102-104 to network 105. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 105 is configured to couple one or more of services 106-109 depicted in FIG. 1 and their respective components with other computing devices, such as client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

In one embodiment, ad services 106 may be a dedicated server or represent multiple servers for providing advertising services to client computing devices. In another embodiment, ad services 106 may be integrated with other services, such as content services 109. In one embodiment, ad services 106 may be used to provide advertisements based on a user profile associated with a particular client computing device identified, for example, by a network address. In one embodiment, a user profile may be associated with a particular client computing device based on a user account login successfully performed at the computing device, the user profile having a previously established correlation with the accessed user account. Ad services 106 may organize and provide ad campaigns including, but not limited to, targeted advertisements based on geographic location, demographic, and/or individualized user profiles. In one embodiment, ad services 106 may be in communication with one or more of blog services 107, comment services 108, and content services 109 to coordinate ad campaigns based on user interactions with such services. For example, if a client device, associated with the user, requests a blog about a target subject from blog services 107, ad services 106 may provide ads related to the target subject to services 107 to be included in the blog web pages when returned to the client device. This request, or other user activity, may be monitored, identified, and stored for future reference in a user profile associated with the user or user's client device.

Blog services 107 may be coupled with other network devices, such as other servers and/or client devices. Generally, in a network environment many clients may connect to one or more servers to request content or other appropriate services, such as comment processing. For example, a browser program on a client device may send a request to web server for a web page. The web server finds the page and returns it to the client device for display to the user of the client device. A client device 101-104 may be coupled to blog services 107 via networks 105 and/or 110. Blog services 107 may in turn be coupled to comment services 108 directly or via network 105. In one embodiment, blog services may find a web page and return it from content services 109.

Blog services 107 may be a web server, an application server, an FTP (file transfer protocol) server, a file server, and the like, or a combination of two or more of such servers. Servers may be implemented in software, hardware, or a combination of both. In one embodiment, blog services 107 and comment services 108 are implemented on one physical network device. In another embodiment, blog services 107 and comment services 108 are implemented on separate network devices. In yet another embodiment, blog services 107 and comment services 108 are implemented as one component performing both sets of functions, as further described below. Blog services 107 and comment services 108 may each include many network devices, such as a server farm, all performing the same functions transparently. That is, the server farm looks and behaves like a single server to client devices from across a network. Server farms are generally used for load balancing in large organizations with many clients. Blog services 107 may be used for publishing blogs (web logs). Blogs are web pages typically published by one or a small group of individuals used to provide forums for user opinions and interaction about specific areas of interest such as politics, sports, science, education, gossip, and the like. A user interested in accessing a particular blog may use his browser to open the particular blog web pages. The user may also be interested in reading or writing comments about certain subject matters appearing in the blog.

In one embodiment, comment services 108 may provide target object management and/or advertisement management in the context of the micro-comments. For example, comment services may maintain lists of words and/or phrases that may be used as target objects for commenting and associating appropriate ads with those words and phrases for deployment to client devices, as further described below with respect to FIGS. 5 and 6. As noted above, in one embodiment, comment services 108 may be implemented as a separate server, while in another embodiment, comment services 108 may be integrated with other services, such as blog services 107 and/or content services 109. As further disclosed below, in one embodiment, a content author may access comment services 108 to provide one or more lists of target objects for use with one or more sets of provided content.

Content services 109 may include virtually any device that is configured and arranged to provide any of a variety of content and/or services over a network. As such, content services 109 may operate as a website for enabling access to such content/services including, but not limited to blog information, educational information, music/video information, social networking content and/or services, messaging, or any of a variety of other content/services. Content authors may access these services to supply the content, information, or otherwise enable services to be provided. However, content services 109 are not limited to web servers, and may also operate a messaging server, a File Transfer Protocol (FTP) server, a database server, or the like. Additionally, content services 109 may be configured to perform a different operation. Thus, for example, content services 109 may be configured as a database server for a variety of content. Moreover, while content services 109 may operate as other than a website, it may still be enabled to receive an HTTP communication. Devices that may operate as content services 109 include personal computers, desktop computers, multiprocessor systems, microprocessor-based or programmable consumer electronics, network PCs, servers, and the like.

Although FIG. 1 illustrates each of services 106-109 as single computing devices, the disclosure is not so limited. For example, one or more functions of comment services 108 may be decomposed and distributed across one or more distinct computing devices, including for example being within content services 109, without departing from the scope or spirit of the present disclosure.

Illustrative Client Environment

Figure 2:
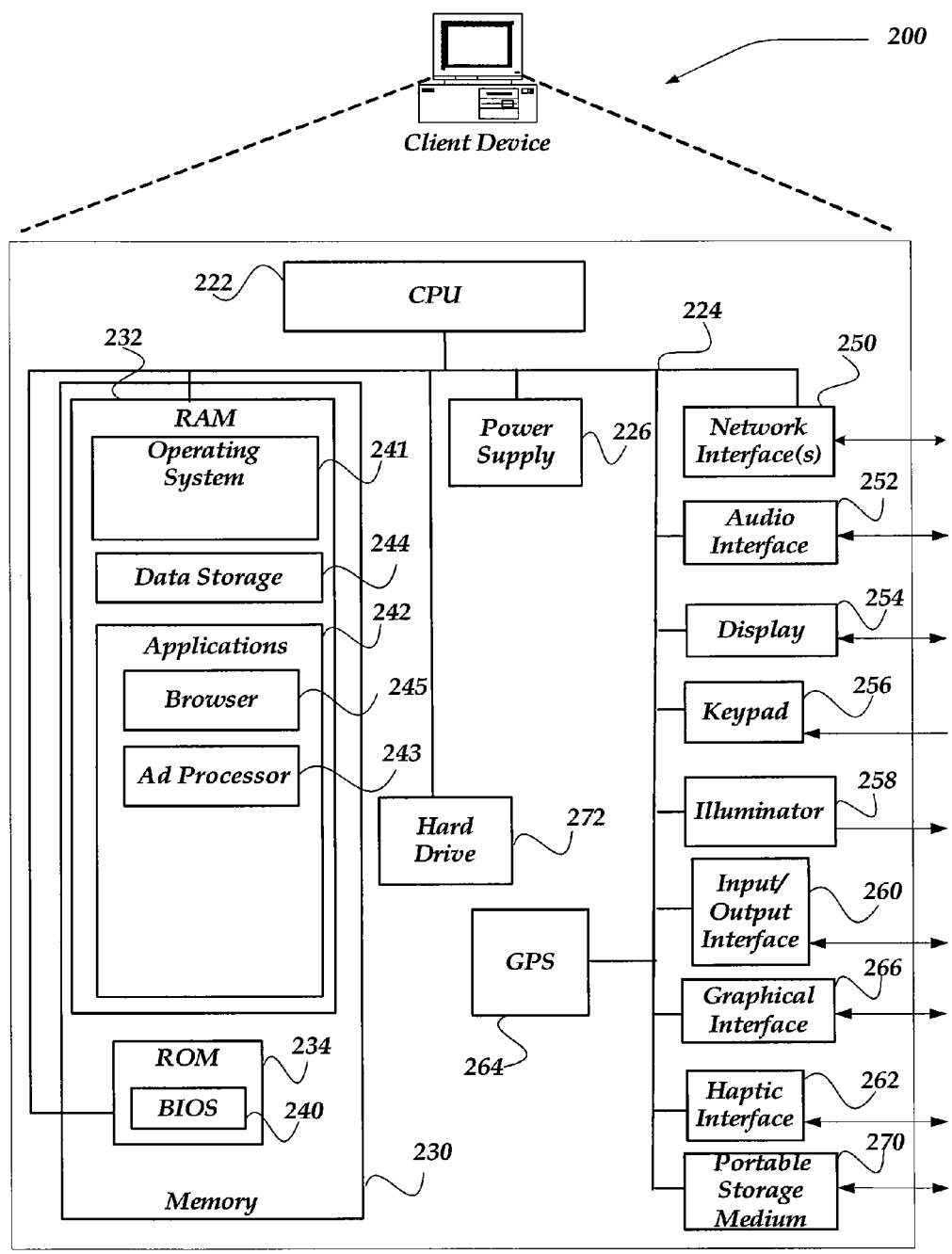
FIG. 2 shows one embodiment of a client device that may be included in a system implementing aspects of the invention.

FIG. 2 shows one embodiment of client device 200 that may be included in a system implementing the invention. Client device 200 may include many more or less components than those shown in FIG. 2. However, the components shown are sufficient to disclose an embodiment for practicing the present invention. Client device 200 may represent, for example, client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252 that may be configured to receive an audio input as well as to provide an audio output, a display 254, a keypad 256, an illuminator 258, an input/output interface 260, a haptic interface 262, a global positioning systems (GPS) receiver 264, graphic interface 266, portable storage medium 270, and hard drive 272.

Power supply 226 provides power to client device 200. A rechargeable or non-rechargeable battery may be used to provide power. The power may also be provided by an external power source, such as an AC adapter or a powered docking cradle that supplements and/or recharges a battery.

Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action.

Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Input/output (I/O) interface 260 can utilize one or more communication technologies, such as USB, infrared, Bluetooth™, or the like. Client device 200 may use I/O interface 260 for communicating with external devices, such as a headset, or other input or output devices not shown in FIG. 2.

Haptic interface 262 is arranged to provide tactile feedback to a user of the client device. For example, the haptic interface may be employed to vibrate client device 200 in a particular way when another user of a computing device is calling.

GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Graphical interface 266 may include both hardware and software components. For example, graphical interface 266 may include a graphic accelerator for rendering graphic-intensive outputs on display 254. In one embodiment, graphic interface 266 may include software and/or firmware components that work in conjunction with CPU 222 to render graphic output on display 254 and/or other display devices.

Portable storage medium 270 may include flash memory in various configurations and form-factors, pluggable hard drive, optical media, such as CD (Compact Disc) and DVD (Digital Video Disc), and the like. In one embodiment, portable storage medium 270 behaves similarly to a disk drive. In another embodiment, portable storage medium 270 may present an interface different than a disk drive, for example, a read-only interface used for loading/supplying data and/or software.

In one embodiment, hard drive 272 may include a Ferromagnetic stack of one or more disks forming a disk drive embedded in client device 200. In another embodiment, hard drive 272 may be implemented as a solid-state device configured to behave as a disk drive, such as a flash-based hard drive. In yet another embodiment, hard drive 272 may be a remote storage accessible over network interface 250 or I/O interface 260, but acting as a local hard drive. Those skilled in the art will appreciate that other technologies and configurations may be used to present a hard drive interface and functionality to client device 200 without departing from the spirit of the present disclosure.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications and/or other data. For example, data storage 244 may also be employed to store information that describes various capabilities of client device 200, a device identifier, and the like. The information may then be provided to another device based on any of a variety of events, including being sent as part of a header during a communication, sent upon request, or the like.

In one embodiment, data storage 244 may also include files for use with, and/or obtained from another network device. Data storage 244 may further include cookies, and/or user preferences including, but not limited to user interface options, and the like. At least a portion of various information, files, and the like, may also be stored on an optional hard disk drive 272, optional portable storage medium 270, or other storage medium (not shown) within client device 200.

Applications 242 may include computer executable instructions which, when executed by client device 200, transmit, receive, and/or otherwise process messages (e.g., SMS, MMS, IMS, IM, email, and/or other messages), audio, video, and enable telecommunication with another user of another client device. Other examples of application programs include calendars, browsers, email clients, IM applications, VOIP applications, contact managers, task managers, database programs, word processing programs, security applications, spreadsheet programs, games, search programs, and so forth. Applications 242 may further include browser 245, and ad processor 243.

Ad processor 243 may be configured to communicate with comment services 108 of FIG. 1 to obtain ads for display on client device 200. In one embodiment, ad processor 243 may collect information about ads within comments made by a user about a target object included in a document, such as a web page, as further described below with reference to FIGS. 4-6. Such information may be used by comment services 108 to build a user profile and/or further refine and tune ads for display on client device 200.

Browser 245 may include virtually any client application configured to receive and display graphic, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed.

In one embodiment, a user may employ browser 245 to perform operations that enable the user or user's client device to be identified. For example, a user may employ browser 245 to perform a login operation for a user account. In one embodiment, a user may perform a pattern of page requests that enable the user or user's client device to be identified. In one embodiment, an IP address, a cookie, or other device identifier may also be used.

In one embodiment, using browser 245, a user may view an article or other content on a web page with one or more highlighted portions as target objects. The user may select a target object and in response, be presented with one or more comments previously entered by other users in regard to the same selected target object. In one embodiment, the user may also enter comments relating to the selected target object that will be visible to other users.

Illustrative Server Environment

Figure 3:
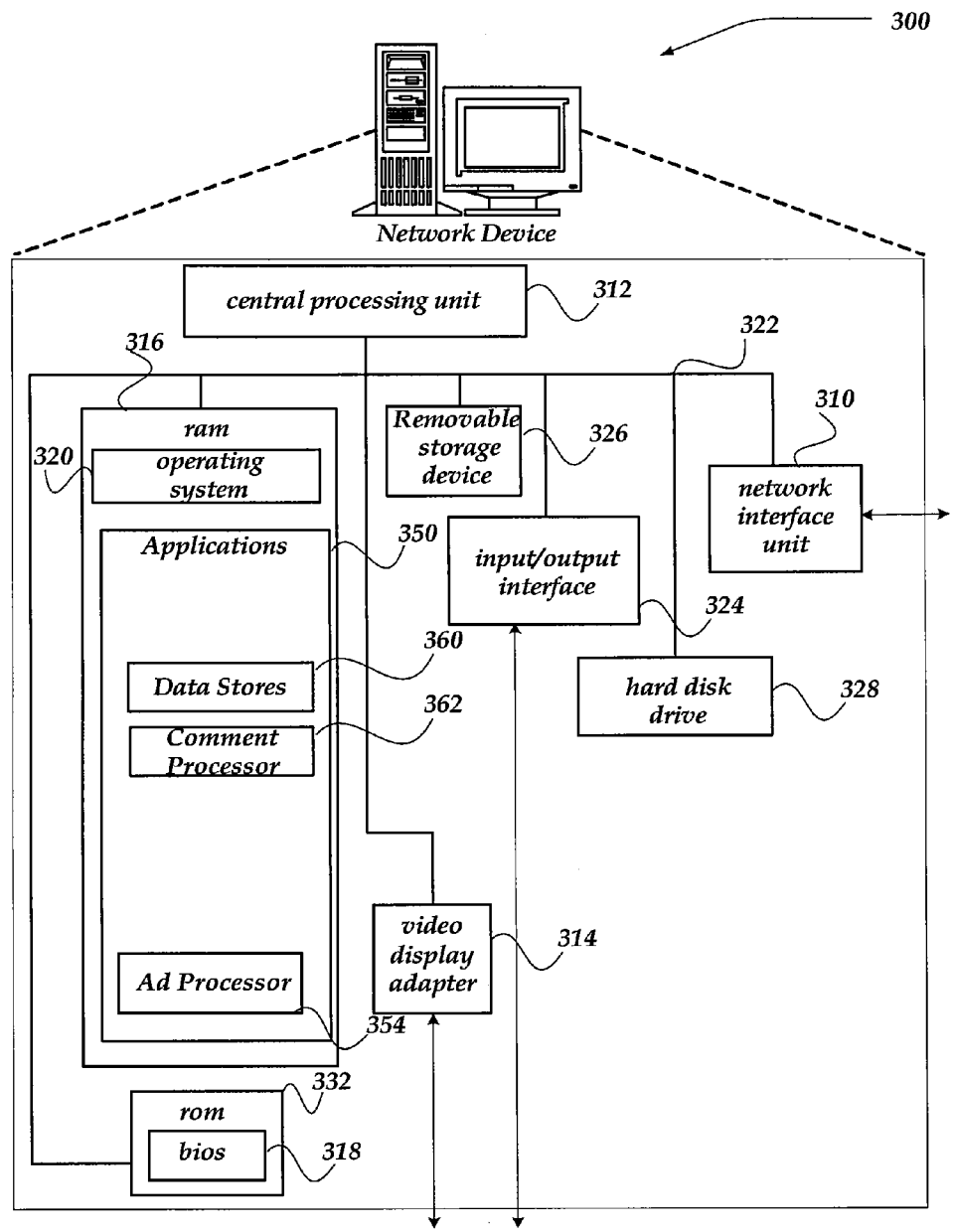
FIG. 3 shows one embodiment of a network device that may be included in a system implementing aspects of the invention.

FIG. 3 shows one embodiment of a network device, according to one embodiment of the invention. Network device 300 may include many more components than those shown. The components shown, however, are sufficient to disclose an embodiment for practicing the invention. Network device 300 may represent, for example, an embodiment for any of the services 106-109 shown in FIG. 1.

Network device 300 may include central processing unit (CPU) 312, video display adapter 314, and a mass memory, all in communication with each other via bus 322. The mass memory generally includes RAM 316, ROM 332, and one or more permanent mass storage devices, such as hard disk drive 328, and removable storage device 326 that may represent a tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol, Wi-Fi, Zigbee, WCDMA, HSDPA, Bluetooth, WEDGE, EDGE, UMTS, or the like. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD)

or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Applications 350 may also include comment processor 362, advertisement (ad) component 354, and data store 360.

Ad component 354 may analyze, store, manage, and retrieve ads targeted towards users based on certain criteria that may be demographic in nature, such as age, sex, ethnicity, income level, and the like, as well as based on other criteria, such as subject matter of the document and/or target objects, as more fully described below with respect to FIGS. 4-10. User-related profile and/or demographic information may be obtained based on questionnaires provided to the user, from third party databases that have information about specific users, geographic area, and the like. In one embodiment, ad component 354 may collect information about ads related to comments made by a user of client 200 about a target object embedded in a document, such as a web page. In one embodiment, the ad component 359 may monitor these comments and other activities performed by a user on a client device. Such information and activities may enable comment services 108 of FIG. 1 to build a user profile and/or further select, refine, and tune ads for display on client device 200. In one embodiment, such information and activities may be used to associate one or more target object lists with a user at a the client device 200.

In one embodiment, comment processor 362 may receive, analyze, store, format, retrieve, and prepare user comments for display on the client devices. Ad processor 354 and comment processor 362 are more fully described with reference to FIGS. 4-6 below.

In one embodiment, data store 360 may be a relational database to store information about comments made by the user of the client device. Data store 360 may also be used to store various target object lists, as more fully described below with respect to FIGS. 7 and 8. In another embodiment, data store 360 may be a flat text, or other types of data file, such as an XML file, for formatting and/or storing such information.

Figure 4:
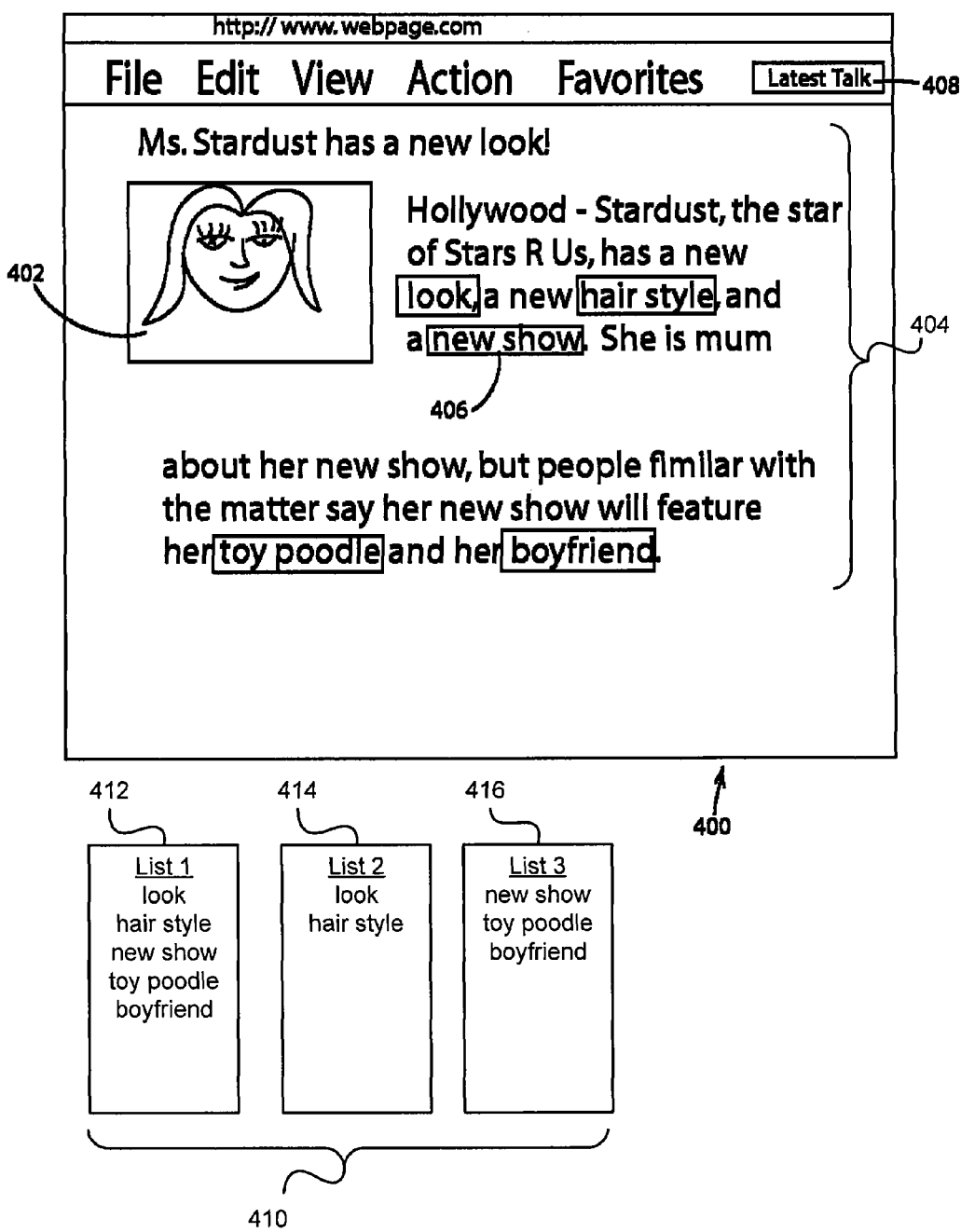
FIG. 4 is a pictorial diagram of a web page depicting an embodiment of an article with micro-comment support.

FIG. 4 is an illustrative web page 400 providing an environment for micro-comment exchange among users. In one embodiment, a user account or other form of identification may be associated with one of client devices 101-104 (see FIG. 1). In one embodiment, the one client device 101-104 may then initiate a request for a web page, for example by entering a URL (Uniform Resource Locator) or selecting a hotlink, via a browser. In response, the browser may send a request packet, for example, using HTTP (hypertext transfer protocol) to blog services 107 (see FIG. 1). In response, blog services 107 may format the web page and return the web page to the requesting client device for display.

As a non-limiting example and with continued reference to FIG. 4, web page 400 shows a gossip blog about a hypothetical celebrity. In this example, web page 400 is used to provide picture 402 of the celebrity, along with blog article 404 about the celebrity. As noted above, the multimedia content may include any number of various subject matters and is not limited to web pages, blogs, or celebrity gossip. In one embodiment, the blog includes toggle button 408 for turning a micro-commenting feature ON or OFF. Those skilled in the art will appreciate that a feature in a software application, such as a browser, may be enabled/disabled in many ways, including a single toggle button, two ON and OFF buttons, radio buttons, menu options, and the like. Once the micro-commenting feature is turned ON, the user may see a number of highlighted target objects that are uniquely identified as target objects, such as target object 406, on the web page for commenting. The target objects may be words, phrases, and pictures, with a special highlight, located throughout blog article 404. The special highlight may include underlined text, bold text, different fonts, different size text, boxed or circled target objects, different color text, and the like that uniquely identifies the target object as being configured to enable a user to associate a comment to one or more of the target objects or that the target objects may already have a comment associated with it. The user may select a target object, such as target object 406, to see micro-comments about the target object. For example, the user may mouse over a highlighted word or phrase to have a small dialog box open showing micro-comments from other users about the highlighted word or phrase. Micro-commenting is described in further detail below with respect to FIG. 5.

In operation, at least two distinct processes may be used to provide the micro-commenting service. During an authoring process, the author of the article or document may specify the target objects on which the users may comment. The target objects may be selectively specified in a plurality of target object lists 410, as shown in FIG. 4 and further discussed below. In one embodiment, this process may take place during or shortly after the authoring phase, but before publishing, when the article is being written/edited by the author. During a usage process, after the article has been written and published, the users may obtain the document, for example, a web page, and read and/or write comments about target objects on one or more lists, each specified by the author during the authoring process and selectively provided to each user based on the author's designation for each list. The authoring process may take place once or occasionally for updates to the article/document, while the usage process may take place thousands of times as various users access the article and comment on the target objects.

During the authoring process, the author may use a tool, such as a word processor, a web interface, or other mechanisms for specifying target objects within the multimedia content that is created. In one embodiment, the target objects may be specified in association with one or more target object lists, each list being managed by the author manually, or generated by the authoring process automatically. For example, in an online article in a blog, to create a list of target objects that uniquely identifies a subset of the content as target objects, the author may highlight, or otherwise indicate which text, graphics, or the like, are to be identified as target objects. For example, in one embodiment, the author might employ a mouse or other pointing tool to specify the target objects within the online article in the blog. In another embodiment, the author might identify the target objects by selecting them from a predetermined list of all possible target objects in the content. In another embodiment, a list of target objects may be shared between authors with similar interests.

In any event, in one embodiment, once text, graphics, clips, or the like, are identified by the author in a target object list, and an association between the list and a requesting client is addressed as discussed below, the target objects may be configured by the authoring tool with embedded links, scripts, or other techniques that enable the target objects to be readily distinguished from other portions of the content within the multimedia content.

In one embodiment, an author may have multiple target object lists 410, each assembled on a different basis. For example, such bases may include a social network relationship, subject matter, target audience, a membership or service subscription, a geographic location where the article is exposed the most, age group of readers, and the like. One or more bases may be designated by the author for each assembled target object list. Each of the multiple target object lists may be unique, respectively differing from the other lists by a relative inclusion or exclusion of at least one target object. Each of the assembled target object lists may be subsequently employed to specify which target objects are rendered identifiable for each client device requesting the content.

An example of the of such lists 410 is further illustrated in FIG. 4. For example, list 412 may be designated for users that request the content and also have a social network relationship of "friends" with the content author. List 414 may be assembled and designated by the author for users that request the content and are associated with the subject matter of "fashion". List 416 may be established and designated for users associated with a geographic location where the new show discussed in the article will be performed.

As noted above, each list may be unique relative to each other list in a plurality of target object lists. As shown in FIG. 4, list 412 is unique with respect to list 414 at least because the target object phrase "toy poodle" is included in list 412 relative to list 414. Also, list 414 is unique with respect to list 416 at least because list 414 excludes the target object phrase "new show". Additionally, list 416 is unique with respect to list 412 at least because the target object word "look" is excluded from list 416.

In one embodiment, a designation for each list may be used to determine whether to associate the subject list with each client device that requests the content. In one embodiment, the association may be determined based on a comparison between the designation for each list and information identifying each client device. For example, a designated social network relationship may be compared with a user account that is logged in, validated, or otherwise active at the requesting client device. A designated subject matter may be compared with information maintained in a user profile associated with the requesting client device. A designated geographic location may be compared with an IP address associated with the requesting client device. When a match is made between a list designation and information that identifies the client device, target objects from the matched list may be specified for identification to the requesting client device as available for associating comments. Target objects in a list that is not matched to the requesting client device are not specified for identification based on the list; However, a target object on an unmatched list may be specified for identification if it is included in a different target object list that is matched with the client device. A list that is not associated with a first client device may be associated with a second client device. A user at the first client device may be inhibited from associating a comment with a target object on an unmatched list, even though a portion of content that corresponds to the target object may remain visible within the content to the user.

In one embodiment, the target object lists 410 may be transmitted to comment services 108 to be recorded in a database. Comment services 108 may associate appropriate advertisements with each target object in each list 414-418 based on various criteria, such as subject matter of target objects or article, target audience, geographic area, a season, language, culture, age, and other demographic criteria. The associated advertisements may be embedded in or linked with a web page that a user downloads later during the usage process. In another embodiment, target objects may be identified to comment services 108 individually for inclusion one or more target object lists, as the target objects are specified. For example, after an article has been written and published, the author may wish to specify and add new target objects for the article.

Once a target object has been specified for identification to a requesting client device, either in a single associated list or as part of multiple associated lists of target objects, executable code, such as a script, may be associated with the specified target object to enable a user on the client-side to interact with the target object. For example, internet scripting languages such as ASP (Active Server Pages), ASP.Net, JavaScript, VBScript, and the like may be used to add functionality to web pages, in contrast to web pages that display static data, and enable user interaction with so-enabled web pages. Scripts may be inserted into web pages that are returned to client devices in response to a request for the web pages. Those skilled in the art will appreciate that scripts may be executed client-side and/or server-side based on the needed functionality and the type of scripts used. For example, JavaScript may be inserted into an HTML based web page and be executed on client side by the browser displaying the web page. ASP may be used on the server-side to perform certain client-independent functions, such as construction of custom HTML web pages. Server-side and client-side scripting may be used together as well, to take advantage of the features that may be available on each side. Such scripts may be executed to perform various actions, including displaying a dialog box, fetching data from a server or other source, such as a database, to display in the dialog box, and the like.

As such, in one embodiment, comments that are associated with a target object selected by the user/viewer of a web page on the client device may be displayed to the user in a dialog box or in a different manner, such as using a side-pane, in a window of the browser. Similarly, such scripts may be used to enable the user to enter new comments related to the selected target object. The entered comments may subsequently be transmitted to a service, such as comment services 108, to be provided to other users of other client devices when such other users view and/or select the same target object.

Figure 5:
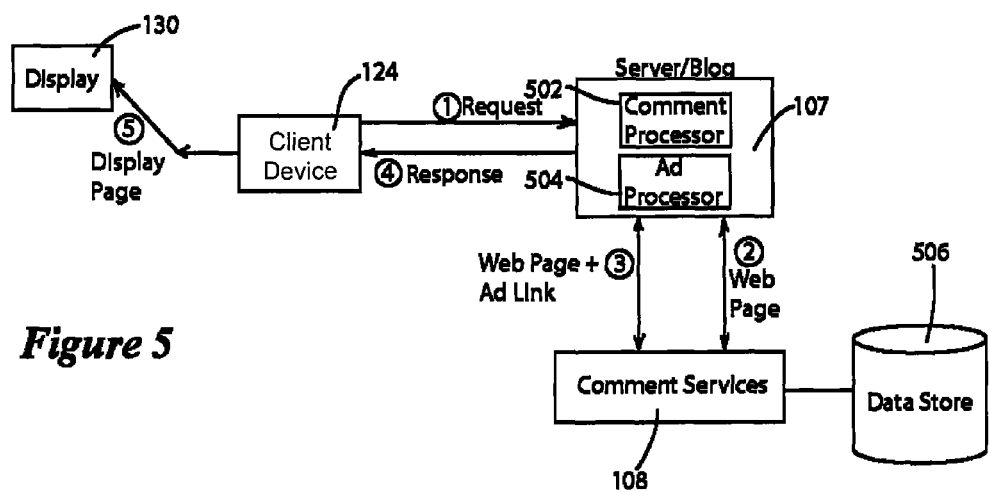
FIG. 5 is a block diagram of a client-sever environment depicting one embodiment of an interaction between the client and the server.

FIG. 5 is an embodiment of the client-server environment depicting possible interaction details between client and server. During the usage process, the user of client device 124 may interact with a browser and the web page article via display unit 130. Client device 124 may represent any of the client devices 101-104 shown in FIG. 1. In one embodiment, client device 124 may send an HTTP request packet to blog services 107. In response, blog services 107 may find the requested web page, determine one or more target object lists associated with the client device 124, configure target objects to be identifiable to the client device 124 based on one or more associated lists and send the web page to comment services 108. Comment services 108 may match and associate ads with the identifiable target objects 406 and return the web page to blog services 107. Next, blog services 107 may return the web page including ads or ad links to client device 124. Blog services 107 may include comment processor component 502, which may interact with client device 124. Blog services 107 may also include ad processor 504 to communicate with comment services 108. In one embodiment, comment processor 502 and ad processor 504 may include multiple modules and run on different servers in communication with blog services 107. In another embodiment, comment processor 502 and ad processor 504 may be integrated together as one or more modules.

A request from client device 124 to blog services 107 may be generated in at least two circumstances. A request may be generated when a user initially requests a web page or when a user selects a target object in a previously received web page to read/write micro-comments about the target object. When a micro-comment request is received from client device 124, comment processor 502 may retrieve micro-comments associated with the selected target object and update the displayed web page with data and scripts configured to enable further display of the micro-comments to the user of client device 124 and/or other users. In one embodiment, the data and scripts for the micro-comments are provided to the client device. In another embodiment, the entire web page, including the micro-comment data and scripts may be returned to the client device 124. Additionally, ad processor 504 may notify comment services 108 of the selection of the target object and comment services 108 may return ad data to ad processor 504 for inclusion in the updated web page before returning the web page or micro-comment data and scripts to client device 124. In one embodiment, ad processor 504 may forward the whole web page to comment services 108 to update the web page with ad information and return the web page to ad processor 504.

In one embodiment, ad processor 504 may collect and/or obtain information about user activities on client device 124 with respect to target object 406 and related ads displayed on client device 124. Such collected information may be used by comment services 108 to build user profiles and/or further refine and tune ads to be displayed in subsequent transactions with client device 124. Such collected information may also or alternately be used to associate one or more target object lists 412-416 with client device 124. For example, user selections made on a web page through key strokes or mouse clicks may be recorded and associated with a subject matter of the web page. Such information may also be aggregated and stored locally on client device 124 or be sent to a database on a remote service for further processing and use. Other derived information such as history of use, frequency of visits to a particular type of web page, and the like, may be extracted from the collected information and be used to provide appropriately associated lists 410 and targeted ads to client device 124.

When an initial web page request is sent to blog services 107, ad processor 504 may notify comment services 108 of the web page request to prepare ads for target objects within the requested web page in anticipation of subsequent target object selections. For example, in one embodiment, comment services 108 may analyze and prefetch ads from a database for fast response when and if the user selects target objects. In another embodiment, comment services 108 may include a number of general ads for display on the web page even before the user selects any target objects.

In one embodiment, if a web page may be sent to comment services 108 from blog services 107 for ad preparation, comment services 108 may analyze target objects, such as target object 406, included in the article on the web page to identify and select appropriate ads for inclusion in the web page. The ads may be selected based on the target objects previously recorded in the database during the authoring process. A data store 506 coupled with comment services 108 may be used to store an ad table or a database of relationships between the target objects 406 and ads related in some manner to target objects 406. For example, if the target object is a word or phrase denoting a vacation resort, the ad database may associate hotels, airlines, and other services that are related to vacation resorts, with the target object. The ad database may be partitioned such that each partition is used for a specific author. Alternatively, partitions may be created based on subject matter of target objects that may be used by all authors. Those skilled in the art will appreciate that many combinations of database tables and partitions are possible for associating ads with target objects without departing from the spirit of the disclosure. For example, an author may have multiple lists of target objects, each list having a separate database partition. Similarly, database partitions including target objects from a particular industry, such as entertainment or political organizations, may be created.

Target objects may be assigned a target ID (identifier) for ease of reference and communications. The target ID creates a layer of flexibility between the target object and components that reference the target object. For example, the target ID may be used in the database tables instead of the word, phrase, or picture itself. The target object may be associated with the corresponding target IDs in another table distinct from the ad database. In this way, the ad database may remain unchanged if the target object changes. For example, a target object may be a picture of a car. A different picture of the same car may be substituted without affecting the ad database. Additionally, target IDs may be used for communication between various software components and servers. For example, if comment processor 502 is on a different machine than blog services 107, target IDs may be sent between blog services 107 and comment processor 502, instead of sending the target objects. Another advantage of using target IDs is the ease of implementation of a database and/or search. For example, if target object 406 is a picture, using target IDs to represent the target object 406, it may not be necessary to store the picture in the database, which may be more difficult, compared with text or numbers, to store, search, and manipulate.

Once the appropriate ads are found by comment services 108, the web page including ad are returned to blog services 107 for sending back to client device 124. In one embodiment, the ads may be included in the web page using hotlinks. In another embodiment, small ads, such as product names or trademarks, may be added directly to the web page. In yet another embodiment, no ads may be included in the web page. Rather, target IDs may be recorded and used by comment services 108 or blog services 107, for dynamic advertising when the user is accessing the returned web page. Target IDs may be used for dynamic advertising, for example, based on user's interest expressed in a particular target object by commenting on the target object. In one embodiment, the user makes a comment on a particular target object. The comment about the target object may then be transmitted over a network where it is received from the client device. Blog services 107 records the comment for later presentation to users, as described more fully below with respect to FIGS. 7 and 8, and notifies, for example, using the target ID, comment services 108 that the corresponding target object has been accessed by the user. Comment services 108 uses the target ID to access data store 506 and retrieve ads associated with the target ID. Such ads are then sent back to client device 124 for display via a web page update. In one embodiment, in response to detecting an action from the client device, the action being identified as being associated with the target object, the user's comment may be selectively displayed back to the client device.

When the user focuses on or selects a target object in the web page on client device 124, for example, by locating a cursor over the target object, a callback function may be executed on client device 124 that sends a request packet to blog services 107 in the background, without any action on the part of the user. The request packet may cause blog services 107 to retrieve and return micro-comments associated with the target object to client device 124. Similarly, if the user enters a micro-comment about the target object, another callback function may be automatically executed to transmit the micro-comment by the user to blog services 107 to be recorded in the list of micro-comments for the target object. In this way, blog services 107 may keep track of all micro-comments from all users directed to the target objects. Those skilled in the art will appreciate that there are many ways a callback function may be implemented. For example, a script embedded in the web page sent to client device 124 may include different callback functions associated with different events, such as a mouse-over event. AJAX (Asynchronous JavaScript and XML) is one technology that can be used transparently for background processing including callbacks. Browsers that support AJAX may be used for such callbacks.

Callback functions may be used in a similar fashion to return ads embedded in web page updates to client device 124. For example, when the user focuses on the target object, a callback function may be executed to send a request packet to blog services 107, which also forwards the request packet to comment services 108. The request packet may include the target ID, which may be used by comment services 108 to return advertising information to blog services 107. Blog services 107 may update the web page to include the advertisements and returns the updated web page to client device 124. It should be noted that the present disclosure is not limited to using callback functions and other mechanisms for communicating and passing data may also be used.

Figure 6:
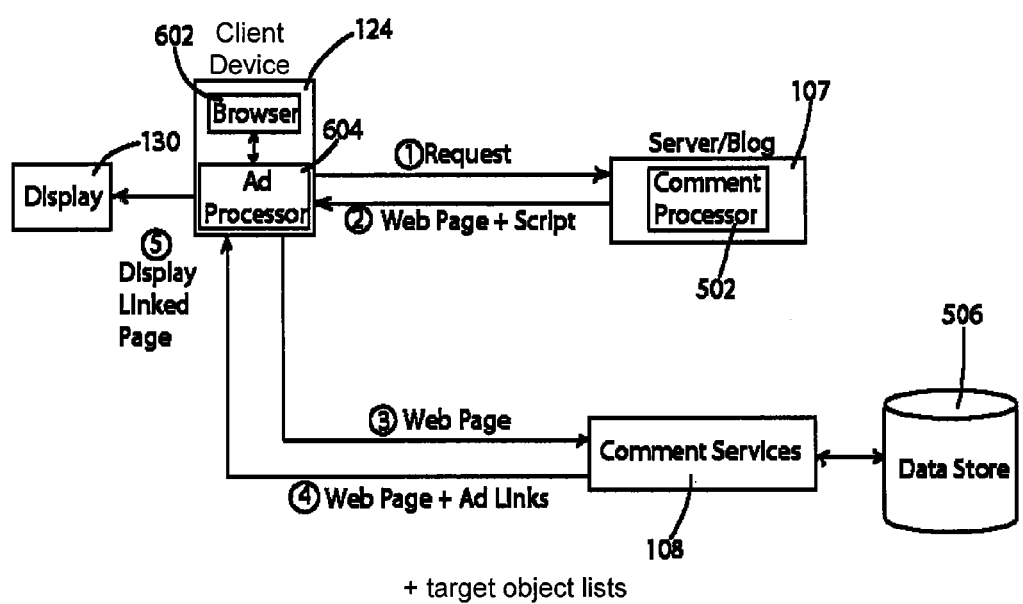
FIG. 6 is a block diagram of a client-server environment depicting another embodiment of an interaction between the client and the server.

FIG. 6 is an embodiment of a client-server environment depicting interaction details between client and server, wherein the client includes ad processor 604 in communication with browser 602. As noted above, client device 124 may represent any of client devices 101-104 of FIG. 1. In one embodiment, some of the ad processing may be performed by the client. The interactions between the client and the server are similar to those described above with respect to FIG. 5, however, in FIG. 6 the client communicates directly with comment services 108 for ads, instead of communicating through blog services 107. Specifically, client device 124 may send a web page request or micro-comment request to blog services 107. In response, blog services 107 may return the micro-comments or requested web page including targeted objects or micro-comments, respectively, to client device 124. Ad processor 604 running on client device 124 may send the web page including target objects to comment services 108. Comment services 108 may analyze the web page to identify and analyze the corresponding target IDs to select appropriate ads for returning to client device 124.

In one embodiment, ad processor 604 may collect and/or obtain information about user activities on client device 124 with respect to target objects 406 and related ads displayed on client device 124. Such collected information may be used by comment services 108 to build user profiles and/or further refine and tune ads to be displayed in subsequent transactions with client device 124. Such collected information may also or alternatively be used to associate one or more target object lists with the client device 124.

Figure 7:
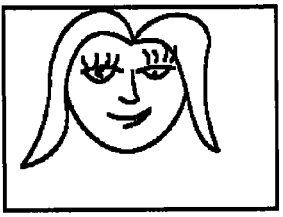
FIG. 7 is pictorial diagram of another embodiment of a web page with micro-comments.

FIG. 7 shows an embodiment of a web page 700 with micro-comments. The micro-comments that are received back from blog services 107 may be displayed in a number of ways to the client on display unit 130. In this embodiment, when the user selects a target object, for example, target object 712, by clicking on it with a mouse pointer, a list of micro-comments related to the target object may appear in summary dialog box 702. In one embodiment, summary dialog box 702 is automatically located within the web page in which the target object is embedded without obscuring a significant portion of the web page. Summary dialog box 702 may include a header section 716 identifying the target object to which the comments are related, body section 704 where the micro-comments are listed, and some control buttons and/or text fields 710 for adding/editing micro-comments. For example, a user at a client device might enter a comment about the target object that may then be sent over a network. The comment (or micro-comment) from the client device about the target object may then be received by comment services 108, blog services 107, or the like. In response to detecting an action from the client device, where the action being identified as being associated with the target object, the received comment may then be selectively enabled for display at the client device, and/or other client devices, along with zero or more other micro-comments. In one embodiment, the received comment may be stored in a data store for later access, display, and/or modification.

Each micro-comment in the list may also include user identification (ID) 706, such as a picture, a name, an avatar, or some other type of identification of the user who commented on the target object. User ID 706 helps foster a sense of continuity of conversation between the users. For example, user ID 706 makes directed communication between two particular users possible where one user with ID 706 directs her later micro-comments to a previous micro-comment of another user with user ID 708.

As such, in one embodiment, the entered micro-comment may be displayed in an order indicating a more recently entered micro-comment higher in a displayed ordering than other micro-comments; however other arrangements are also possible. The range of displayed list of micro-comments may be configured in various ways. For example, the list of micro-comments displayed might be limited based on time, such as comments entered in the last two hours only, number of comments, particular users, such as only users that are logged in to the system, and the like. In one embodiment, the micro-comments list may be paged with appropriate controls, so the user can view comments outside the current display range. Alternatively, the dialog box may include a scroll bar to scroll through comments. In another embodiment, the comments may appear in a different pane, such as a side or bottom pane where the main web page content is not obscured allowing the user to simultaneously read/write comments while also viewing the original article. This arrangement is helpful because if the user is commenting about a visual aspect of the article, such as a picture, she is likely to want to continuously look at the picture while commenting. In another embodiment, summary dialog box 702 may appear in a location on the screen such that no part of the selected target object is obscured.

In one embodiment, summary dialog box 702 includes a section for advertising. For example, an ad pane 714 on the side or bottom of summary dialog box 702 may be used to insert ads in a manner described above with respect to FIGS. 5 and 6. In another embodiment, ads may be displayed in other areas of the main web page. For example, ads related to the currently selected target object may be dynamically selected and displayed on panes around the web page. When a user selects a first target object, one set of ads may be dynamically displayed and when the user selects a second target object, a different set of ads may be displayed. In another embodiment, summary dialog box 702 may include a control (not shown), such as a button, that when activated keeps the dialog box open even if other target objects are selected and other corresponding dialog boxes are opened. In yet another embodiment, summary dialog box 702 may stay open by default until the user closes it by a positive action, such as clicking a Close button or using some other mechanism. In yet another embodiment, the behavior of the dialog box may be configurable to behave in any one or more of the manners described above. In one embodiment, summary dialog box 702 may also include filter buttons/menus to select the micro-comments displayed based on time, user ID, number of comments, length of comments, or other criteria.

In one embodiment, the users may be offered an opportunity to register for membership or subscription to enjoy further benefits and services. For example, registered members may login to their account and receive notification of new articles, news, video clips, and the like, about their favorite subjects or celebrities. Furthermore, members may be given access to more target objects and or more details and information about the target objects than available to non-members. For example, a member may have access to recent photos of their favorite celebrity, not generally or publicly available yet. In one embodiment, access to more target objects is provided to a member based on associating one or more additional target object lists with the client device the member employs to access the content.

Members may also be given additional discounts or other advantages on certain products and services that are advertised on the web page in which they are viewing the article. Members may also be given a "louder" voice when they write micro-comments. For example, a long-term member who is active in logging in and commenting about various target objects may be given the advantage of having that member's micro-comments presented with a special emphasis, such as underlined text, larger sized text, different color text, or a prominent position in summary, detailed or expanded view dialog boxes 702 and 802 (see FIG. 8), respectively.

Another advantage that members may be offered is earning of points that are redeemable towards purchasing products, services, or gaining other advantages. For example, a certain number of points may be offered to a member for each comment that she makes about a target object. The points may also be weighted. For example, comments about a particular target object may earn more points than another target object. In one embodiment, the quality of micro-comments made by a member may be rated by other members. The rating a member receives may determine a number of points earned as well as how prominently that member's micro-comments are displayed.

Figure 8:
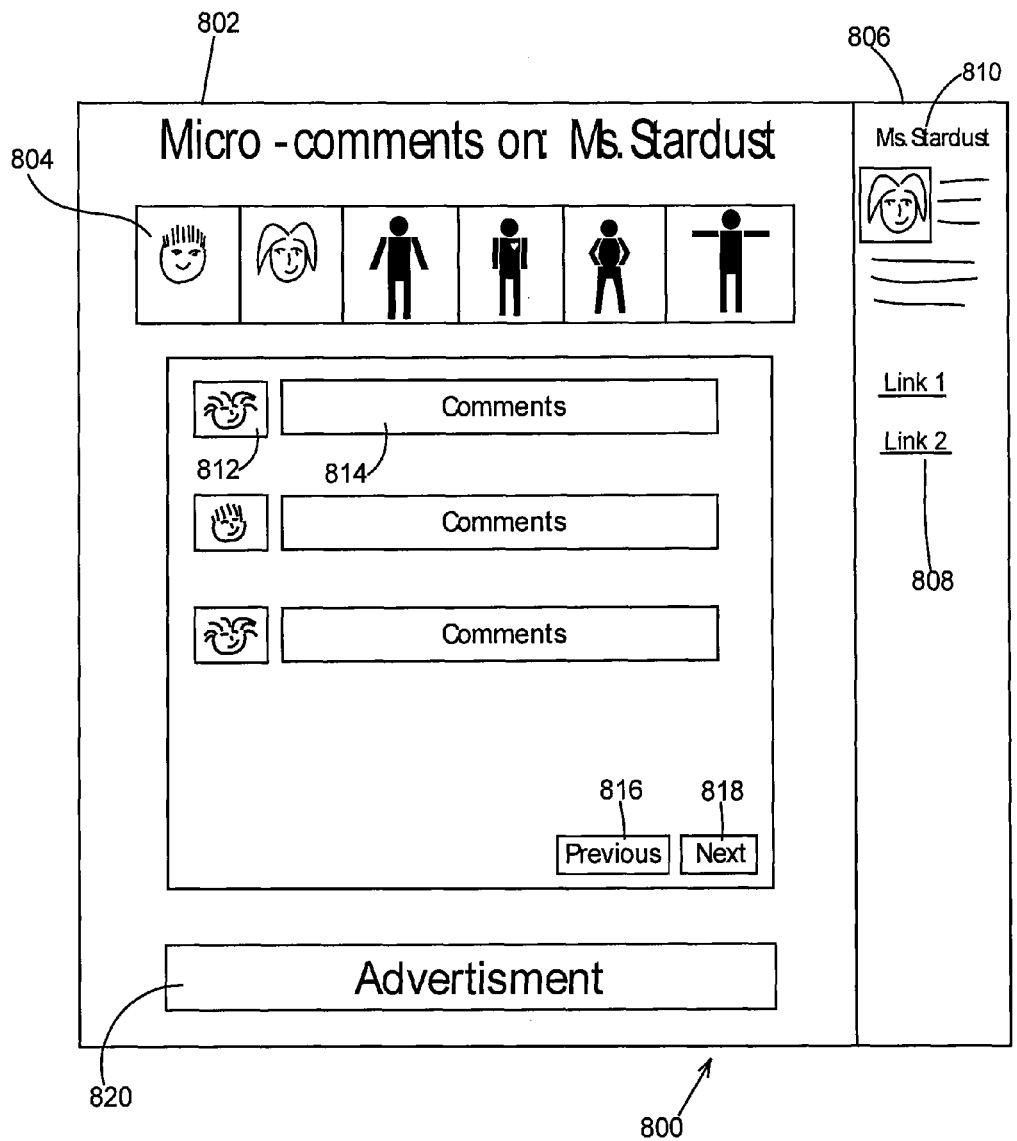
FIG. 8 is a pictorial diagram of an embodiment of a list of micro-comments related to an embedded object in a web page in an expanded view.

FIG. 8 is an embodiment of a expanded list of micro-comments about a target object. In one embodiment, if the user wants more information about the target objects and the article than presented on summary dialog box 702, the user can select the target object in a different way, such as by double-clicking or right-clicking with a mouse and selecting a menu option, to open detailed dialog box 802 to display a more extensive list of micro-comments related to the selected target objects. Detailed dialog box 802 may have many of the same features presented in summary dialog box 702, but in more detail and more extensively. For example, in one embodiment, all micro-comments about the selected target object may be available via detailed dialog box 802 subject to various filters and methods of display for limiting the number of micro-comments visible at once. Similar to summary dialog box 702, detailed dialog box 802 may include filter buttons/menus 816 and 818 to select the micro-comments displayed based on time, user ID, number of comments, length of comments, or other criteria. Additionally, detailed dialog box 802 may include an integrated ad panel 820 for more extensive and/or full-featured ads. For example, integrated ad panel 820 may provide facilities for playing video clips, provide links to related services/products, and/or the like. List of user IDs 804 commenting on the target object may be provided to see who among the user community is currently online and/or commenting about the selected target object. The list of comments may include short comment 814 along with corresponding user ID 812. User ID 812 may be an avatar, a picture, or other form of identification, such as a nickname. In one embodiment, separate information pane 806 may be attached to detailed dialog box 802 to provide still further information about the target object in particular, and/or the subject of the article, in general. For example, if the article is about celebrity 810, information page 806 may provide links to other articles or news stories about celebrity 810, links 808 to more information about the target object, for example, hair styles, and/or the like.

Figure 9:
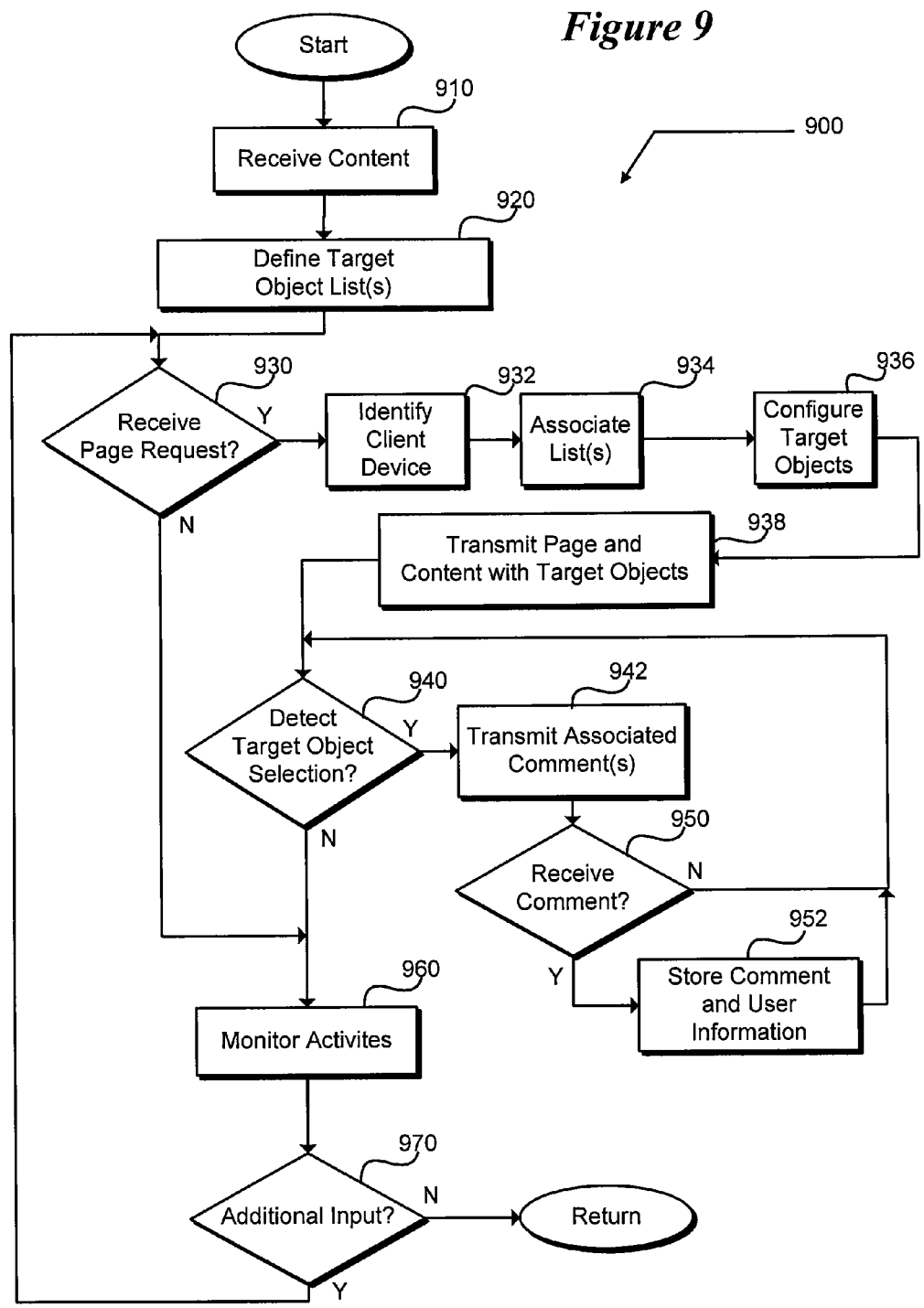
FIG. 9 is a flow diagram generally showing one embodiment of a process of server-side micro-comment and ad processing.

FIG. 9 is a flow diagram of an embodiment of a server-side micro-comment process 900. With reference to FIGS. 1, 3, 5 and 9, the process 900 starts at block 910 where content is received at a server or a server-side network device. In one embodiment, this content may be received from a content author. In one embodiment, this content may be received at content services 109. For example, a content author may provide text, pictures, and other multimedia content to content services 109 to be served online by blog services 107 to client devices 101-104 as an article in a blog. Moreover, the content author may employ one of the client devices 101-104 to provide the content to content services 109.

After receipt of the content, we move to block 920 where one or more target object lists are defined for the content. In one embodiment, the plurality of target object lists are manually provided by the author of the content. Additionally, one or more of the target object lists may be automatically generated by an authoring process during the composition of the content. One or more of the lists may also be shared from a second content author with similar interests. In one embodiment, one or more target object lists may be predetermined by a third party such as blog services 107 that also serves or hosts the content. Regardless of the manner in which they are provided, each provided list for the content may be unique with respect to the one or more other target object lists defined for the content. In one embodiment, each unique list differs by a relative inclusion or exclusion of at least one target object that may be listed or not listed therein. The uniqueness of each list is further discussed with respect to FIG. 4.

Each defined list may include a designation or other criteria that enables it to be associated with one or more client devices. For example, one designation or basis for association includes a social network relationship defined by the author. That is, a target object list may have the designation of "friends", wherein a user at a client device requesting the involved content must be validated by an online social network as having a specific relationship status with the author in order to associate comments with a target object listed in the target object list. Other bases of assembling lists may include a subject matter, a target audience, a membership or service subscription, a geographic location from where content may be requested, an age group of readers, and the like. Further, one or more designations may be specified for each target object list, enabling each list to be matched or associated with a client device for one or more of a plurality of bases. Once defined at the server-side, each target object list and its respective one or more designations may be stored for subsequent use, such as in data store 360 as presented with respect to FIG. 3. After the at least one target object list is defined, the process 900 proceeds to decision block 930, enabling use of the provided content and defined target objects lists.

Moving to decision block 930, a determination is made as to whether a page request has been received. The requested page may correspond to a document in which the content received in block 910 may be served to a client device. In one embodiment, the page request may be received by blog services 107 from a client device 124. As noted above, although the World Wide Web (WWW) is used as an illustrative environment for describing the general process, the illustrated concepts are equally applicable to other computing and communication environments, such as dedicated software application programs and protocols used within an intra-network found in corporations, university campuses, and government offices, and the like. If a page request is determined to have been received, processing proceeds to block 932. If a page request has not been received, process 900 continues at block 960.

In block 932, a client device from which the page request is received may be identified. Such identification may be established based on one or more of a variety of different bases, including a current and valid user account, a user profile, a membership, monitored user activities, a network address, explicit information in the request, or information determined through separate process. Additionally, each of these bases of identification may be provided or verified by an online social network with respect to the client device requesting the content. In one embodiment, the identification may be made by blog services 107. For example, blog services 107 may employ the activities monitored by ad processor 106 to associate a user identity, category, or other form of identifying qualification with a requesting client device. In one embodiment, a client device may be identified as an unregistered client device if an applicable basis of identification is not received or enabled for correlation with the client device requesting the page. After an identification has been determined for a client device making the request, the process 900 continues at block 934.

At block 934, the one or more of the defined target object lists are associated with the client device requesting the page. In one embodiment, the association of the at least one target object list may be based on the identification of the client device in block 932. In one embodiment, the association of the at least one target object list may be based on criteria unrelated to an identification, such as a time of day, a volume of requests received for the page, a number of comments received for the one or more target object lists, a random criteria, a sponsorship of the one or more target object lists, an advertising agreement for the one or more target object lists, and a default criteria.

For target object list associations based at least in part on an identification of the client device, the one or more designations for each target object list may be compared with the identification of the client device. If a designation matches the identification determined for the client device, the target objects from the matched list may be specified for identification to the requesting client device. For example, for a designation of "friends", an identification of a user at a client device may be compared with a relationship status, if any, between the user and an author of the requested content. In one embodiment, a comparison may be made between a list designation and monitored activities associated with the requesting client device. For example, if monitored activities indicate that a user at the requesting client device views a predetermined number of web sites related to fashion, then an association with "fashion" may be stored for the client device and used in a comparison with one or more designations for each list of target objects for requested content.

The association of the one or more list may be an inclusive process, resulting in the addition of target objects that are on a matched list, but it may not prevent a target object in an unmatched list from being added overall if it is also listed in a matched list. An unmatched list, different from the at least one associated list, may be associated with a second client device relative to the client device that provided a request currently being processed. Providing comments may be inhibited for target objects in the one or more defined lists that are on an unmatched list and not on one or more matched lists. The target objects in an unmatched list may be provided and viewed with content transmitted to a user, but are not identifiable to a user at the client device as available for associating comments.

In one embodiment at block 934, the association may be performed by blog services 107. After one or more target object lists are specified based on associating of the at least one target object list with a requesting client device, process 900 proceeds to block 936.

In block 936, the specified target objects may be configured as identifiable within the content as being available for associating comments. In one embodiment, the content may be retrieved from content services 109. In one embodiment, where the micro-comments are maintained by blog services 107, blog services 107 configures the specified target objects in the requested web page. In one embodiment, this step may be performed by comment services 108. In one embodiment, the specified target objects may be configured with embedded links, scripts, or other techniques that enable the target objects to be readily distinguished from other portions of the content within the multimedia content. For example, internet scripting languages such as ASP (Active Server Pages), ASP.Net, JavaScript, VBScript, and the like may be used to add functionality to web pages, in contrast to web pages that display static data, and enable user interaction with so-enabled web pages. Scripts may be inserted into web pages that are returned to client devices in response to a request for the web pages. Those skilled in the art will appreciate that a script, as a basis for configuring a target object, may be executed on the client-side and/or on the server-side based on the needed functionality and the type of script used. Configuring a target object to be identifiable as being available for associating comments may include at least one of highlighting the target object, changing a font size relative to other font sizes in the content, changing a font type relative to other font types in the content, underlining the target object, changing a color of the target object relative to other portions of the content, or other modifications to uniquely distinguish the target object from other portions of the content that are not identifiable as available for associating a comment.

In one embodiment at block 936, configuring each target object may also comprise analyzing the target objects or target object IDs to retrieve a set of ads from a data store 360 for each of the target objects. In one embodiment, scripts may be embedded in the web page that may include a mechanism, such as a callback function, for dynamically retrieving ads as the user interacts or selects various target objects on the web page. In another embodiment, ad hotlinks may be placed in the web page so the user can click on the hotlinks when selecting target objects for micro-comments. Those skilled in the art appreciate that other methods of integrating ads with the web page is possible without departing from the spirit of the present disclosure. In one embodiment, retrieving ads for each target object may be performed by comment services 108 in communication with services 106, as discussed with regards to FIG. 1. For example, the retrieving of ads may be performed by an ad component 354 discussed herein with regards to FIG. 3.

The requested web page with configured target objects and embedded ads and/or the information for embedding ads in the web page may be returned to the requesting client device 124 at block 938. In one embodiment, the ad information may be integrated with the web page based on the information received from comment services 108. In one embodiment, the web page may be transmitted by blog services 107 to the requesting client device, enabling display at the client device of the content with the target objects specified for the client device configured therein. After transmission of the requested web page, process 900 continues to decision block 940.

At decision block 940, a determination may be made regarding whether an action has been detected from the client device. In one embodiment, the action may be detected as associated with a target object. For example, the detected action may comprise a selection of the target object based on positioning a mouse pointer over the target object. In one embodiment, the action may trigger a callback function that indicates the selection to the server as well as a target object that is associated with the detected action. For example, a "mouseover" of a target object on client device 124 may trigger a request to be sent to comment services 108 for one or more comments associated with the selected target object. The detected action, as received by the server, may indicate how the action may be handled, including a number of comments to be provided and information that enables identification of the client device. In one embodiment, additional handling information for the detected action, such as the number of comments to be transmitted to a client device, may be stored at the server and associated with the action upon detection. If an action is detected at decision block 940, processing proceeds to block 942; otherwise, the steps of process 900 continue at block 960 and the display of one or more received comments is inhibited.

At block 942, one or more comments associated with the action and the identifiable target object may be retrieved and transmitted to the client device at which the action was detected, enabling selective display of the one or more comments at the client device. In at least one embodiment, the one or more comments available and provided to the client device include a plurality of comments, at least two of which are received from different client devices. In one embodiment, the comments may be provided to the client device based on an identification of the client device. In one embodiment, if a target object was enabled for associating comments by a client device on a first basis, such as a target object list designation, the comments provided to a client device may be selected from comments stored for the target object that were enabled to be first provided on the same basis or designation. For example, a client device enabled to associate comments with a target object based on a social network relationship may receive a different set of comments than a second client device enabled to associate comments with the same target object based on a geographic location. In one embodiment, a client device may be provided access to all comments for a target object, regardless of a basis or designation involved with configuring the target object for a client device. The transmitted comments may include the most recent comments received at the server.

In one embodiment, transmitting the comments may be performed by blog services 107. At least one of the comments transmitted to the client device may have been received from a second client device and/or received from a different user. The transmitted comments may include one or more advertisements retrieved and provided, for example, by advertisement services 106. In one embodiment, no comments may yet be available for the target object and a default comment may be transmitted to the client device, the default comment comprising an indication that comments from other users or client devices are not available, or encouraging a user at the client device to provide a comment. In one embodiment, detecting the action may enable display of the one or more comments received by the client device over a portion of the content in a separate window at client device. In one embodiment at block 942, transmitting the comment to the client device further comprises enabling another comment related to the selected target object to be entered, the other comment being selectively displayable at another client device. After one or more comments are transmitted 942, the process 900 may continue to decision block 950.

At decision block 950, a determination may be made as to whether a comment is received from the client device for the target object associated with the detected action. For example, a comment regarding the target object "Hair Style" shown in FIG. 7 maybe received at blog services 107 for further handling by comment processor 502. In one embodiment, the comment may be received after explicit submission of text at the client device by the user. In one embodiment, the comment may be a second or another comment provided for the target object in addition to one or more comments previously transmitted to the client device. In one embodiment, the comment received from the client device may be a second or another comment provided for the target object in addition to one or more comments previously received from the same user or client device. The comment may be limited to a predetermined number of words, the limit being imposed at the client device prior to a submission of the comment or implemented at the server by clipping the comment after receipt. In one embodiment, the comment may include a target object ID. In one embodiment, a received comment may include information identifying a user, client device, or at least one basis for which the target object was configured to be identifiable to the client device. For example, a received comment may include a user name, a network address, or an indication of a status held between the content author and a user at the client device, the status able to be formally provided or validated by an online social network. If a comment is determined to be received, process 900 proceeds to block 952. Otherwise, processing returns to decision block 940 to detect the selection of the same or different target object in transmitted content.

In block 952, a received comment may be stored for future access. For example, a comment for a target object may be stored by blog services 107. Along with the received comment, additional information may be stored, including a target object ID, a timestamp, and information identifying a user, a client device, or a basis upon which the target object was configured to be identifiable to the client device. After storage of the comment at block 952, process 900 continues to block 940 in order to detect selection of a same or different target object in the transmitted content.

In block 960, activities of one or more client devices may be monitored by the server. In one embodiment, the monitoring may be performed by ad services 106. Activities monitored in block 960 may include a network access history, including for example, previously visited web pages, previous login or account access events, duration and/or frequency of previous web page accesses, user information or feedback explicitly entered at the client device, execution of applications at the client device, recipients and frequencies of messaging events, and changes to processing capabilities of a particular client device. In one embodiment, the monitored activities may be employed to update a user profile. The monitored activities may be stored, for example, in a data store 360 in a manner accessible to ad processes of ad services 106 and as well as a target list association processes. However, monitored activities used to update a user profile may be obtained through a variety of other mechanisms, over a plurality of other websites, and the like. In one embodiment, activities may be monitored until an additional input is received at the server. In one embodiment, monitoring activities may continue for a predetermined period of time.

Upon completion of monitoring activities at block 960, process 900 proceeds to decision block 970 where it is ascertained whether more inputs, such as additional page requests, are received at the server. If more web pages are requested, the process returns to block 930 and repeats the process described above. Otherwise, the process 900 ends, returning to perform other actions.

Figure 10:
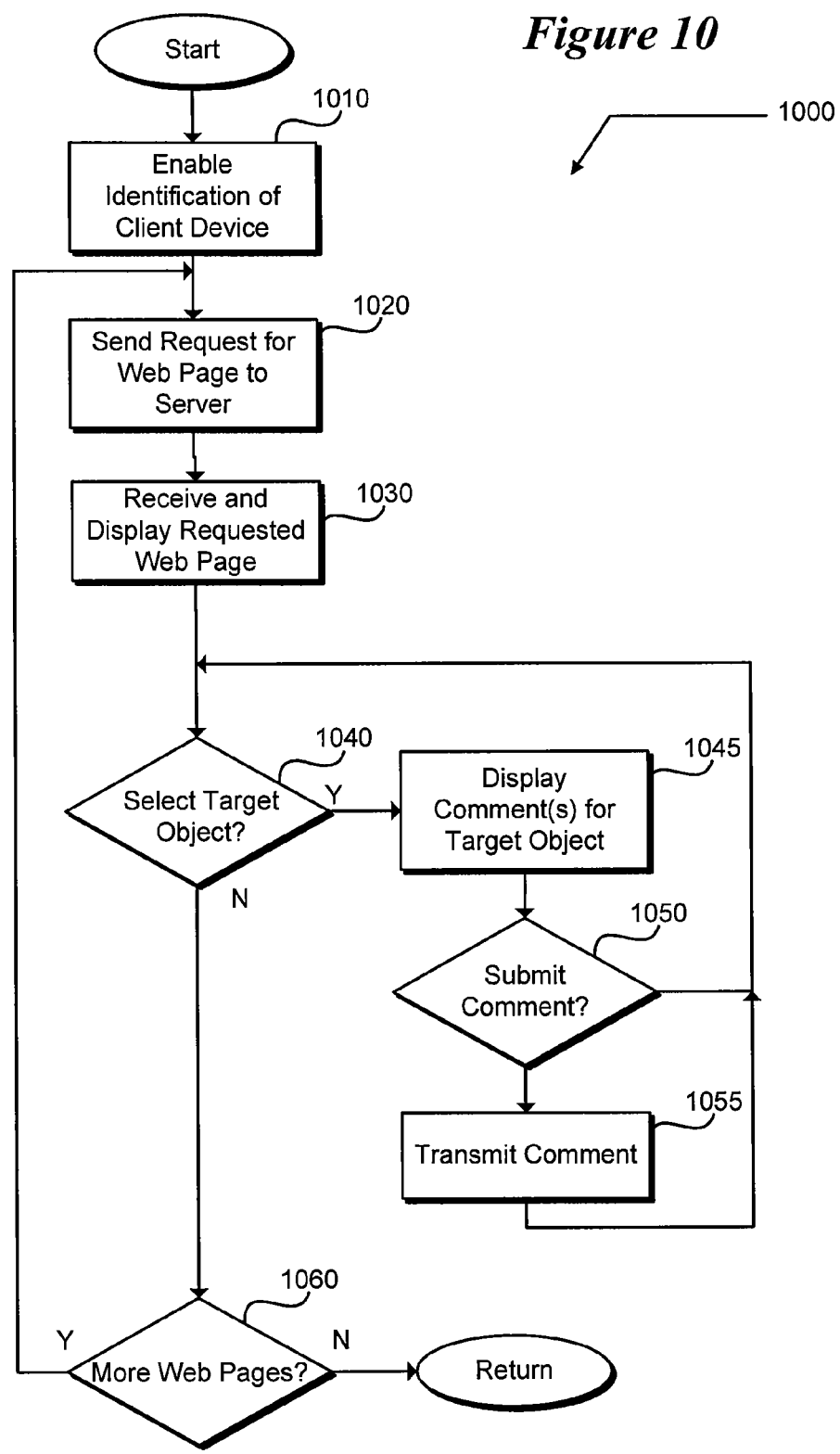
FIG. 10 is a flow diagram generally showing one embodiment of a process of client-side micro-comment and ad processing.

FIG. 10 is a flow diagram of an embodiment of a client-side process 1000 for handling comment and ads at a client device. In one embodiment, ad processor may be implemented on client device 124 instead of blog services 107, as is further shown in FIG. 6. Upon initiation, the process 1000 begins at block 1010 where one or more actions are performed by a client device, such as client device 124, that enable the client device to be identified. For example, a user at client device may login in to user account at a web portal or an online social network. In one embodiment, enabling the client device to be identified comprises employing a network address to connect to the internet or other connected network. In one embodiment, enabling identification comprises launching an executable or other application at the client device. Upon identification 1010, process 1000 proceeds to block 1020.

In block 1020, a request for a web page may be sent from the client device to a server. For example, client device 124 may use a browser 602 to send a request for a blog article from blog services 107. In one embodiment, the request may be an initial request for the web page or it may be due to a selection of a link in a previously sent web page. In one embodiment, the web page request comprises an indication of the identification of the client device. In another embodiment, the identification of a client device may be determined by a server separately from the web page request. Upon transmission of the request, process 1000 continues to block 1030.

In block 1030, the requested web page received and displayed at the client device. For example, client device 124 may receive and display web page 400 shown in FIG. 4 on display 130. In one embodiment, receiving the web page comprises additional processing, such as the execution of scripts, to enable one or more target objects to be displayed in the content of the requested web page. Upon display of the web page, including the display of one or more target objects as identifiable as available for associating one or more comments, process 1000 continues to decision block 1040.

At decision block 1040, a determination may be made as to whether an action at the client device is performed in association with a target object. In one embodiment, the action may comprise a selection of the target object. For example, a user at client device 124 may position a mouse pointer over a target object that is identifiable as available for associating comments. In one embodiment, the action may comprise a selection made through a keyboard input, such as tabbing to the target object with a tab key. The action may trigger a request, sent from the client device to a server, indicating the target object associated with the action with the target object. In one embodiment, the request may be made using a suitable mechanism, such as a callback function. In one embodiment, the action may cause the target object ID to be provided to the server. Executing the action may enable information to be provided to the server comprising indication of the user, client device, or other identifying information regarding a context of the action performed at the client device. If an action is determined to be performed, process 1000 proceeds to block 1045. Otherwise, processing continues to decision block 1060.

At block 1045, one or more comments are received and displayed at the client device. In one embodiment, an entire web page, including data for the one or more comments is received. In another embodiment, the comment data is received for inclusion in the web page received and displayed at block 1030. The comments may be associated with a target object that was subject of the action performed in decision block 1040. For example, client device 124 may display at least one comment in a dialog box 702 such as further illustrated in FIG. 7. In one embodiment, the action performed at block 1040 may enable display of the one or more comments in a separate window over a portion of the content received in the requested web page. In one embodiment, the one or more comments may be displayed within a summary dialog box, a selection of which may enable another display of the received comment to be displayed that provides additional information about the received comment and a second comment. For example, additional information may include a user identification 706 of one or more users that entered the comments, indication of a social network relationship between a user at the client device and a source of the comment, an advertisement, and/or a timestamp associated with an initial submission of the comment. In one embodiment, another input from the user at the client device may enable the client device to provide an expanded view of the comment with one or more parts of the additional information. In one embodiment, receiving and displaying the one or more comments may comprise receiving and displaying an advertisement with the one or more comments. Upon receipt and display of the at least one comments and/or additional information, process 1000 proceeds to decision block 1050.

At decision block 1050, a determination may be made as to whether a comment is submitted at the client device. For example, submitting a comment may include selecting entry 710 on web page 700 at client device 124 and receiving text entered at the client device that constitutes the comment, the text including an indication of the end of the entered text. In one embodiment, the length of the submitted comment is limited by a text entry form to a predetermined number of words. If a comment is received, processing continues to block 1055. Otherwise, the process 1000 continues to decision block 1060.

At block 1055, the submitted content may be transmitted to a server. For example, client device 124 may transmit a submitted comment to comment processor 502 in blog services 107. In one embodiment, transmission of the comment includes a target object ID, indicating the target with which the comment is to be associated. Transmission of the comment may include transmitting additional information, including information identifying the user, the client device, the basis upon which the user was enabled to associate the comment with the target object, a timestamp, or other information identifying the comment and/or the context upon which the comment is provided. Upon transmission of the comment, process 1000 returns to block 1040 for to determine if a second target object is subsequently selected, the target object being the same or a different target object associated with the comment transmitted at block 1055. In one embodiment, the comment transmitted in block 1055 is available for viewing if a same associated target object is selected in block 1040.

Processing flows next to decision block 1060, where a determination may be made as to whether more web pages are requested. If more web pages are requested, the process returns to block 1020 and repeats the process described above. Otherwise, the process terminates and processing returns to perform other operations at the client device. The processes 900 and 1000 provide one example of the overall data and control flow that may support a micro-commenting environment.

Those skilled in the art will appreciate that the micro-comment processing methods may be embodied in various combinations of hardware and software partitioned between client device 124, blog services 107, and comment services 108 based on various considerations of cost, feasibility, control, and other constraints.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
    a transceiver configured to communicate with a client device over a network; and
    a processor that is operative to perform actions, including:
        receiving content and a plurality of target object lists from a content author, wherein each target object list identifies a unique subset of content as target objects within the received content and each unique subset differs by at least one target object;
        determining whether a user at the client device is validated by an online social network as having a relationship status with the content author;
        associating at least one of the plurality of target object lists with the validated user of the client device based in part on the subject matter of the target objects, wherein the associating of the at least one target object list with the validated user of the client device is based on a social network relationship definable by the content author, and wherein the associating of the at least one target object list with the validated user of the client device is performed by a third party;
        enabling display of the received content at the client device, wherein the target objects in each associated target object list are identifiable within the received content as being available for associating comments based on the client device association;
        receiving from the client device a comment about one of the identifiable target objects;
        in response to detecting an action, the action being detected as associated with the identifiable target object within the received content, selectively enabling display of the received comment;
        receiving another input from the client device; and
        providing an expanded view of the comment with at least one other comment, and information about users having entered the comments.

2. The network device of claim 1, wherein the third party is a blog service.

3. The network device of claim 1, wherein enabling display of the received content at the client device further comprises:
    inhibiting comments from being associated with a second target object within the received content, the second target object being listed in at least one target object list in the plurality of target object lists that is different from the at least one associated target object list.

4. The network device of claim 1, wherein associating the at least one target object list with the client device comprises:
    monitoring activities performed by the validated user on the client device; and
    associating the at least one target object list with the client device based on the monitored activities.

5. The network device of claim 1, wherein selectively enabling display of the received comment further comprises:
    if the action is detected, enabling display of the received comment in a separate window over a portion of the received content; and
    if the action is undetected, then inhibiting the display of the received comment and the separate window over the portion of the received content.

6. The network device of claim 1, wherein selectively enabling display of the received comment further comprises selectively enabling display of a plurality of comments associated with the identifiable target object, wherein at least one of the plurality of comments is received from a different client device than another of the plurality of comments.

7. The network device of claim 1, wherein the target object is identifiable as being available for associating comments based on at least one of highlighting of the target object, a font type, a font size, an underlining of the target object, or a color, to uniquely distinguish the target object from another portion of the content.

8. A system comprising:
    a client device configured to display content and comments within a browser and receive and provide instructions over a network; and a network device configured to communicate with the client device over the network and further perform actions, including:

receiving the content and a plurality of target object lists from a content author, wherein each target object list identifies a unique subset of content as target objects within the received content and each unique subset differs by at least one target object;

receiving a request from the client device for the received content;

determining whether a user at the client device is validated by an online social network as having a relationship status with the content author;

associating at least one of the plurality of target object lists with the validated user of the client device based in part on the subject matter of the target objects, wherein the associating of the at least one target object list with the validated user of the client device is based on a social network relationship definable by the content author and identified with the client device, and wherein the associating of the at least one target object list with the validated user of the client device is performed by a third party;

configuring the target objects in each associated target object list within the received content as available for associating comments;

transmitting the received content to the client device over the network, wherein the configured target objects are identifiable within the received content;

receiving a comment about one of the identifiable target objects within the received content;

in response to detecting a selection of the identifiable target object at the client device, selectively enabling display of the received comment at the client device;

receiving another input from the client device; and providing an expanded view of the comment with at least one other comment, and information about users having entered the comments.

9. The system of claim 8, wherein the third party is a blog service.

10. The system of claim 8, wherein selectively enabling display of the received comment further comprises displaying at least one advertisement that is selected to be related to a subject of the identifiable target object.

11. The system of claim 8, wherein the network device comprises:

an advertisement component operating on a processor and configured to perform actions, further including:

monitoring activities performed by a user on the client device; and enabling the monitored activities to be used to select an advertisement for display with the retrieved comment.

12. The system of claim 8, wherein the network device is operative to perform further actions, including:

in response to the selection of the identifiable target object at the client device, enabling the validated user of the client device to enter another comment related to the selected target object, wherein the entered comment is selectively displayable at another client device.

13. The system of claim 8, wherein the received comment is displayed within a summary dialog box and wherein selecting the summary dialog box enables another display of the received comment to be displayed that provides additional information about the received comment and another comment.

14. A processor-readable storage medium having instructions encoded thereon that when executed by a processor cause actions to be performed, the actions comprising:

receiving content and a plurality of target object lists from a content author, wherein each target object list identifies a unique subset of text within the received content as target objects and each unique subject differs by at least one target object;

determining whether a user at the client device is validated by an online social network as having a relationship status with the content author;

associating at least one of the plurality of target object lists with the validated user of the a client device based in part on the subject matter of the target objects, wherein the associating of the at least one target object list with the validated user of the client device is based on a social network relationship definable by the content author, and wherein the associating of the at least one target object list with the validated user of the client device is performed by a third party;

displaying the received content at the client device, wherein the target objects in each associated target object list are identifiable within the displayed content as being available for associating comments based on the client device association;

receiving from the client device a comment about one of the identifiable target objects;

in response to detecting an action from the client device, the action being detected as associated with the identifiable target object, selectively displaying the received comment at the client device;

receiving another input from the client device; and providing an expanded view of the comment with at least one other comment, and information about users having entered the comments.

15. The processor readable storage medium of claim 14, wherein the third party is a blog service.

16. The processor readable storage medium of claim 14, wherein displaying the received content at the client device further comprises:

inhibiting comments from being associated with a second target object within the received content, the second target object being listed in at least one target object list in the plurality of target object lists that is associated with a second client device.

17. The processor-readable storage medium of claim 14, wherein selectively displaying the received comment further comprises selectively displaying a plurality of different comments and at least two of the plurality of different comments are entered by different users.

18. The processor-readable storage medium of claim 14, wherein selectively displaying the associated comment further comprises displaying a plurality of comments associated with the identifiable target object, wherein at least one of the plurality of comments is received from a different client device than another of the plurality of comments.

19. The processor-readable storage medium of claim 14, wherein an advertisement component is employed to select an advertisement for display with the comment.

* * * * *